Oct. 26, 1937.   R. C. LEGAT   2,097,099
FASTENER
Filed Feb. 3, 1936   2 Sheets-Sheet 1
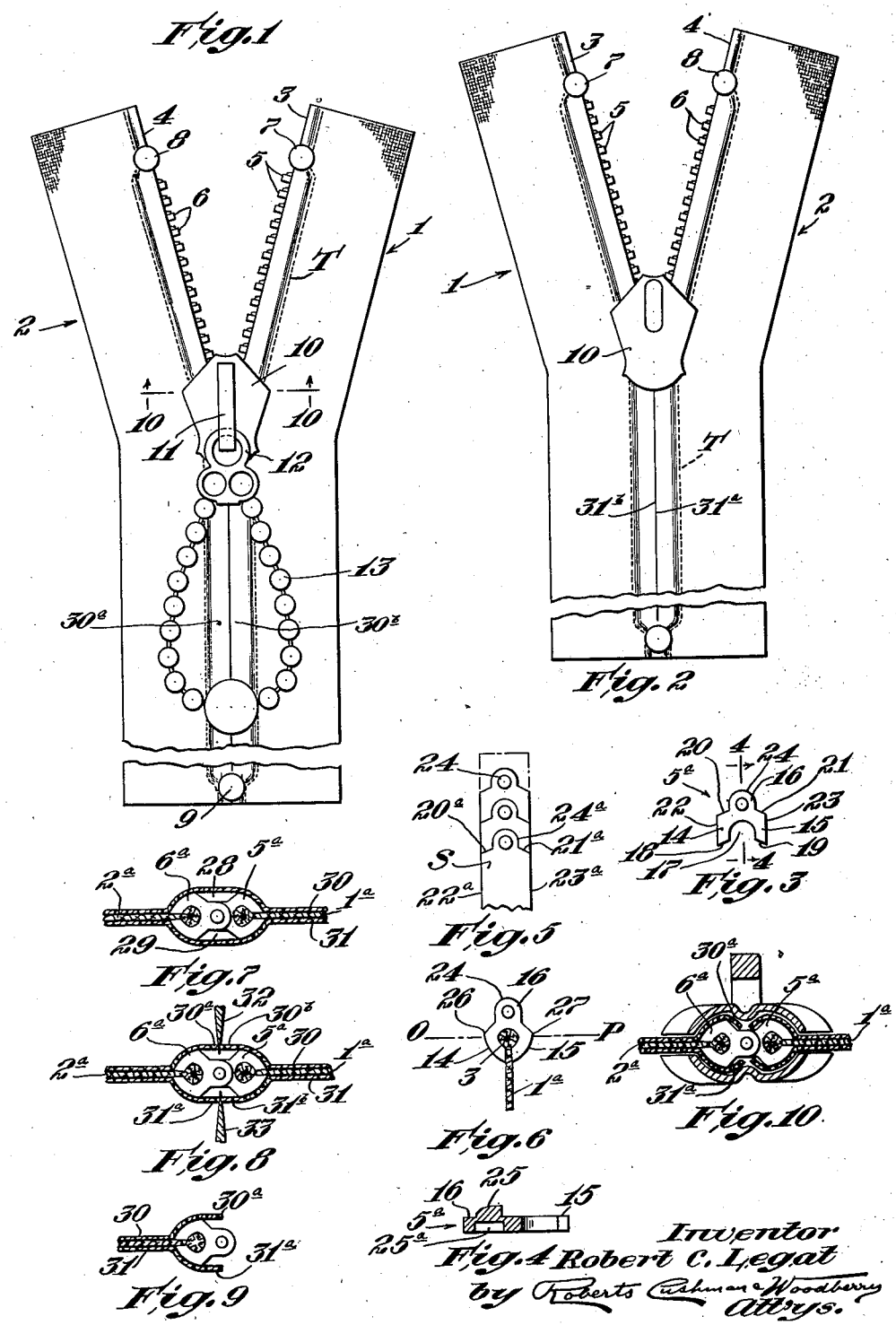
Inventor
Robert C. Legat
by Roberts Cushman & Woodberry
Attys.

Oct. 26, 1937. R. C. LEGAT 2,097,099
FASTENER
Filed Feb. 3, 1936 2 Sheets-Sheet 2
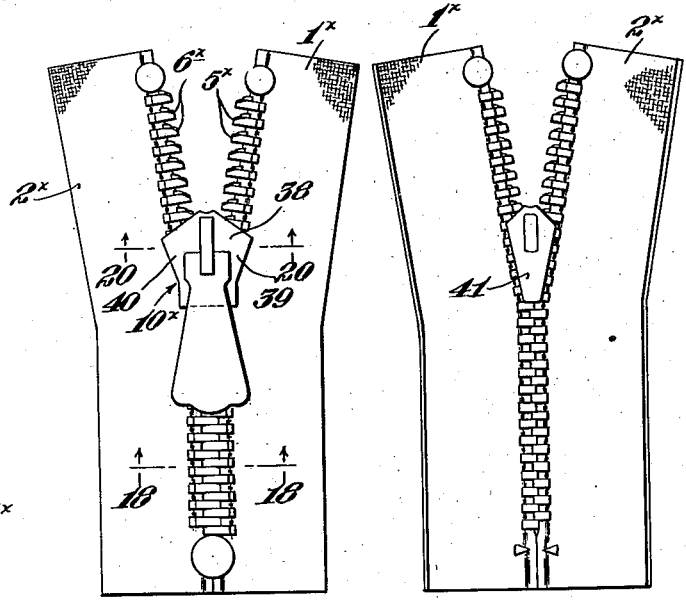

Patented Oct. 26, 1937

2,097,099

UNITED STATES PATENT OFFICE 2,097,099

FASTENER

Robert C. Legat, New Britain, Conn., assignor to G. E. Prentice Manufacturing Company, New Britain, Conn., a corporation of Connecticut Application February 3, 1936, Serial No. 62,065

9 Claims. (Cl. 24—205)

This invention pertains to slide fasteners and to a method of making the same. While in its broader aspects the invention is of general utility, since it affords a fastener which is very light in weight,—thin (in a front-to-rear direction),—flexible, and economical to manufacture, the improved fastener unit of the present invention is of particular value for use in fasteners wherein the units are substantially concealed when the fastener is closed. The advantages of the covered fastener as compared with fasteners in which the units are exposed, are well known to those familiar with the slide fastener art and need not here be explained. However, prior attempts to obtain such advantages have sometimes necessitated the sacrifice of certain other desirable characteristics, for example free flexibility, daintiness of appearance and ease of manufacture.

Covered fasteners as heretofore devised may be grouped generally into two classes. In the first, the inner ends of the attaching jaws of the fastener units are engaged directly by the walls of the slider channel in the same way as in the usual uncovered fastener and the adjacent edges of the covering flaps must be pushed aside by the slider-actuating pull device as the slider is moved. In the second class, the covering flaps themselves are received within the slider channels so that their free edges are not exposed to wear by contact with parts of the moving slider. The present invention relates to covered fasteners of the latter class. In accordance with one prior construction, the attaching jaws or root portions of the fastener units are embedded in narrow strips of vulcanized rubber or the like, extending longitudinally of the fastener and adhering to the stringers, each rubber strip comprising a free, thin, flap portion which overlies the outer or interlocking ends of the fastener units and which is designed to contact the edge of the corresponding strip associated with the opposed series of units. While such an arrangement is highly useful, particularly for application to overshoes, etc. where the parts are exposed to rough usage, moisture, dirt, etc., a fastener so devised is not as flexible as might be desired and is not always acceptable, by reason of its weight, thickness, and somewhat clumsy appearance, for use on thin and light-weight garments. Moreover, the thin rubber flaps,—if the fastener be kept in storage for a considerable time, tend to oxidize and become brittle.

Attempts have been made to secure the desired results, (without recourse to the use of rubber or similar material) for example, by attaching a ribbon of textile fabric to the front face of each stringer tape in such a manner that the free edge of each ribbon overlaps the fastener units and engages the free edge of the ribbon carried by the opposite stringer when the fastener is closed, but with fastener units of ordinary type, this method of providing the covering flap also results in an undue increase in the thickness of the fastener as a whole, particularly if the ribbon be applied both to the back and front sides of the stringer. Moreover it is difficult and expensive, as a practical commercial procedure, to apply ribbon in such a way as to insure accuracy of contact between the free edges of the ribbons carried by the associated stringers. On the other hand, if the ribbons are not applied both to the front and rear faces of the fastener, the metallic fastener units are exposed at one side, for example, the inner side, which is highly undesirable when the fastener is employed in garments in which the units are thus exposed for direct contact with the skin of the wearer.

It has also been proposed to attach the fastener units to a fold of the stringer tape, leaving a loose flap beyond the fold to serve as a cover, but here difficulty is experienced in so applying the units as to leave a flap of uniform width and adapted to make accurate contact at all points with the edge of the flap of the other stringer, and this mode of procedure also prevents the application of a flap both to the front and rear sides of the fastener.

Among the objects of the present invention are to provide a fastener of neat, dainty and attractive appearance, acceptable for use in garments of substantially any type and which is flexible, and light in weight and which may include cover means for the fastener units at either or both sides of the fastener as desired, the cover means being of a nature such that it is not subject to rapid deterioration either during use or in storage, and which at the same time may be made rapidly, economically and without substantial difficulty and within a commercially permissible cost range, and whose covering flaps have their free edges so accurately matched throughout the length of the fastener as completely to conceal the units but without any overlap of the edges of the flaps.

Other objects are to provide an improved fastener unit so designed as to reduce the amount of metal in a fastener to a minimum; which is of such external shape that when the fastener is closed a distinct channel extends longitudinally at the region of the overlapping of the free ends of the units, such channel receiving the free abutting edges of the covering flaps as the slider moves longitudinally with consequent tendency to bias the flaps inwardly and thus insure proper closure even after long periods of use; to provide a unit having attaching legs or jaws which incline inwardly toward the plane of the stringer thereby eliminating square corners and producing a neater, smoother and more pleasing appearance, and at the same time to provide a fastener of minimum front to rear thickness.

When, in a fastener of usual commercial type, the slider is moved to close the fastener the side flanges of the slider act as cams to apply force to the inner ends of the fastener units thereby to draw the edges of the garment together and permit interengagement of the opposed series of fastener units. The force thus exerted may be quite considerable (for example when closing a tightly fitting garment or the like) and as it is applied to the extreme inner ends only of the fastener units and not usually exactly in line with the longer dimension of the unit, there is often developed a strong tendency to tip the unit out of proper position, especially if its anchorage to the stringer is not as firm as it should be. Such tipping of the units interferes with the proper closure of the fastener and causes jamming of the parts. To avoid this effect so far as possible it has heretofore been accepted practice to allow approximately one-third of the unit to project beyond the edge bead with the other two-thirds employed as anchorage means, although, so far as proper anchorage alone is concerned, not nearly so much material is necessary. Thus merely in order to assure proper presentation of the opposite units for interengagement in closing the fastener, it has heretofore been thought necessary to use excessively long units with consequent loss in flexibility in the fastener, increase in weight and uneconomical use of material.

In accordance with the present invention, involving the use of an improved fastener unit which increases in front-to-rear thickness from its inner end substantially to the plane of the axis of the edge bead, it is possible so to shape the slider that the closing pressure will be exerted over a considerable area of the unit extending from its extreme inner end outwardly to such point of maximum thickness. By thus distributing the applied force, and particularly by applying a substantial part of it closely adjacent to the edge bead, there is far less tendency to tip the unit out of proper position. In fact the tendency seems to be to restore the unit to proper position even if misplaced, and even though the units may be loose upon the stringer they may be interengaged without substantial danger of jamming. Since the applied force is also distributed over the inner surface of the slider, instead of being concentrated at its extreme outer edges, there is less danger of spreading the slider wings than usual, even though in the new fastener units the contact surfaces are divergent or beveled.

Since the units as thus designed have so much less tendency to tip than do units of usual type, it is possible to decrease the length of the unit, as compared with usual practice, so proportioning the parts that the bottom of the recess for the edge bead lies substantially midway of the length of the unit. Thus a smaller unit is made possible; the metal actually used is usefully employed; the fastener is unusually flexible; and the cost of manufacture is less than that of usual constructions.

Other objects and advantages of the invention will be made manifest in the following more detailed description and by reference to the accompanying drawings wherein Fig. 1 is a fragmentary front elevation of a slide actuated fastener embodying the present invention and showing the fastener partly closed;

Fig. 2 is a rear elevation of the fastener illustrated in Fig. 1;

Fig. 3 is a plan view, to large scale, illustrating an improved fastener unit constituting a feature of the present invention;

Fig. 4 is a section to larger scale on the line 4—4 of Fig. 3;

Fig. 5 is a diagrammatic plan view illustrating a preferred method of producing fastener units such as illustrated in Figs. 3 and 4;

Fig. 6 is a horizontal section through one stringer of a fastener, showing a unit such as that of Fig. 3 in plan view and as it appears after it is secured to the stringer;

Fig. 7 is a view similar to Fig. 6, but showing a pair of complementary stringers with their fasteners interlocked, and illustrating one step in the method of providing a covering for the fastener units;

Fig. 8 is a view similar to Fig. 7, but illustrating the further step of slitting the cover;

Fig. 9 is a view generally similar to Fig. 7, but showing only one of the stringers with its attached unit and with its covering elements after the coverings have been slit;

Fig. 10 is a section substantially on the line 10—10 of Fig. 1, illustrating the action of the slider upon the covering elements as the slider is moved up and down;

Fig. 11 is a view similar to Fig. 7, but showing the stringers and their attached units without the covering elements;

Fig. 12 is a fragmentary front elevation of the parts shown in Fig. 11;

Fig. 13 is a view similar to Fig. 11, but showing an improved form of slider in horizontal section designed for actuating units of the improved type herein disclosed;

Fig. 14 is a diagrammatic vertical section through a slider of a usual commercial type associated with fastener units of ordinary form and illustrating the direction of the applied forces when the slider is actuated for closing the fastener;

Fig. 14a is a section substantially on the line 14a—14a of Fig. 14;

Fig. 15 is a fragmentary elevation of a stringer having a unit of ordinary type secured thereto and illustrating a usual effect of applying fastener-closing force at the inner end only of the unit;

Fig. 16 is a front elevation illustrating a fastener employing the improved units of the present invention but provided with a slider of modified construction;

Fig. 17 is a rear view of the fastener of Fig. 16;

Fig. 18 is a section substantially on the line 18—18 of Fig. 16;

Fig. 19 is a fragmentary front elevation of the parts shown in Fig. 18; and

Fig. 20 is a section to larger scale substantially on the line 20—20 of Fig. 16.

Referring to the drawings, the numerals 1 and 2 designate flexible stringers or supports of the kind commonly employed in slide actuated fasteners for supporting the opposed series of interlocking fastener units. These stringers 1 and 2 are furnished with edge beads 3 and 4, respectively, forming anchorages for the opposed series 5 and 6 of fastener units. As usual, the fastener is provided with top end stops 7 and 8 of any desired type and with a bottom end stop 9 which also may be of any usual type, either separable or not, as preferred. The fastener is also provided with an actuating slider 10 which may be of any suitable construction but which is preferably of the special form hereinafter more fully described. This slider is desirably furnished with a loop member 11 at its front side and this loop member supports a ring 12 to which any suitable actuating element may be attached, for example, a flexible chain 13.

Referring to Figs. 3, 4, and 5, the present invention contemplates the employment of an improved fastener unit comprising anchoring or attaching legs or jaws 14 and 15 and the head portion 16. The attaching or anchoring jaws or legs 14 and 15 are spaced apart, being separated by a recess 17, the recess preferably having substantially parallel side walls and an arcuate inner end wall, while the free ends of the legs are preferably inclined as indicated at 18 and 19 (Fig. 3) so as to converge toward the inner end of the recess, these ends 18 and 19 hereinafter being referred to as the "inner" ends of the unit. The head 16 is of substantially less width than the main body of the unit, preferably of an external width not substantially greater than the edge bead to which the unit is to be attached, such head being in fact of substantially the same size and shape as the recess 17. At each side of the head the unit body terminates in inclined shoulders 20 and 21 which converge toward the outer end of the unit, the outer edges 22 and 23 of the unattached unit being substantially parallel while the end 24 of the head is of arcuate curvature. The shoulders 20 and 21, in the unattached unit, are substantially parallel to the end surfaces 18 and 19, respectively, of the legs.

The unit as thus devised may be made very economically and without any waste whatever of material, according to the method diagrammatically illustrated in Fig. 5. In thus manufacturing the units, a strip S of suitable material, for example sheet metal, is first provided, such strip having substantially parallel edges 22ª and 23ª spaced apart substantially the same distance as the outer surfaces 22 and 23 of the unattached unit of Fig. 3. This ribbon or strip S is then advanced by successive steps into the field of action of a suitably shaped cutter or die which forms successive incisions in the strip, each incision extending completely across the width of the strip and comprising the curved or arcuate central portion 24ª and the lateral, divergent straight portions 20ª and 21ª. Each incision completely severs the strip and each such incision forms at the same time the inner end of one unit and the outer end of the next unit. Simultaneously with, or before or after the actuation of the cutting die, as may be preferred, the material of the strip is subjected to the operation of a cupping die which forms a projection or pin 25 in one of the wide faces of the ribbon or strip, and a corresponding recess or socket 25ª in the opposite face. It will be noted that, as a result of this mode of procedure, the outer edges 22 and 23 of the unit, as illustrated in Fig. 3, are unchanged portions of the original edges 22ª and 23ª of the strip S, the head 16 of each unit representing that part of the original strip which is removed in making the recess 17 of the next unit, while the shoulders 20 and 21 of one unit correspond to the inclined ends 18 and 19 of the jaws or legs of the next unit. Thus in accordance with this mode of procedure there is no waste of material whatever. By providing the inclined shoulders 20 and 21, the legs are of greater effective length than though the shoulders were cut square, and the attached unit is of more symmetrical and pleasing contour.

After the units have been formed in the shape illustrated in Fig. 3, they are attached to the edge bead of the stringer in accordance with any desirable procedure, that is to say, for example, they may be attached one by one, in succession, to the stringer as fast as they are formed from the metal strip, or, if preferred, they may be submitted to some intermediate operation, for example, tumbling, plating or the like, in order to provide them with nicely finished outer surfaces, and then attached to the stringer by means of any appropriate mechanism adapted to perform such operation.

In attaching the unit to the edge bead of the stringer, pressure is applied to the spaced legs or jaws 14 and 15 so that the metal is bent and caused to flow until the parts take substantially the position indicated in Fig. 6. In thus causing the jaws or legs 14 and 15 of the unit to embrace the edge bead 3 of the stringer 1ª, for example, the end surfaces 18 and 19 of the jaws are brought very nearly into parallel relation and substantially into contact with the opposite faces of the stringer tape 1ª while the outer edges 22 and 23 of the legs are caused to assume such a relative position that they diverge from said inner or free ends toward the opposite end of the unit. Thus, in the attached unit, the points 26 and 27 which substantially represent the junctions of the surfaces 20 and 22 and of the surfaces 21 and 23, respectively, define the thickest portion of the unit. In fact the unit, in plain view, when attached, is of approximately shield shape, truncated at its inner end where it straddles the edge bead of the tape and having, at the other end of its longer axis, the projecting head portion 16 provided with the arcuate end surface 24. It may be noted that the point of greatest front-to-rear thickness lies substantially in the front-to-rear plane O—P (Fig. 6) of the axis of the edge bead, and that this plane lies nearer to the inner end than to the outer end of the unit,—the unit decreasing in front-to-rear thickness from this plane both inwardly and outwardly.

When it is desired to make a fastener of covered type the stringers 1ª and 2ª (Fig. 7) are furnished with fastener units 5ª and 6ª of the improved type just described, and after assembly of the stringers, their opposed series of units are interengaged so that the fastener is completely closed. To the front face of the closed fastener there is then secured a cover piece 30 and if both faces of the fastener are to be covered a similar cover piece 31 is applied to the rear face of the fastener. These cover pieces 30 and 31 are of any suitable material, for example thin and flexible textile fabric,—woven, braided or the like, and of any desired color and texture, and these cover pieces 30 and 31 may, if desired, first be secured to the tapes by means of adhesive such as rubber cement, latex, gum, cellulosic or resin cement, or the like, and then, if desired, these strips may be stitched to the respective tapes by seams T, extending longitudinally of the tapes and as close to or as far from the respective series of units as may be desired. Preferably the covering material extends from the region of the interengaged fastener units laterally to a distance such that when the finished fastener is attached to a garment or the like, the attaching seams will pass through the covering material as well as through the stringers proper.

As illustrated in Fig. 7 the covering strips, as first applied, extend integrally across from one stringer to the other, bridging the interengaged fastener units. By reason of the fact that the head portions 16 of the fastener units are materially narrower than the body portions of the units there is formed a shallow, longitudinally extending channel 28 and 29, respectively, at the front and rear of the interengaged fastener units, and intermediate the thickest portions of the latter, such thick portions of the units of each series, in effect forming a ridge or rib extending longitudinally of the series.

After the covering members have been applied so as to bridge these channels 28 and 29, the fastener is then subjected to the action of a cutter or cutters 32 and 33, respectively, which slit the covering material substantially midway of the portion which bridges the channels 28 and 29 so that each cover is then divided to form free flaps 30ª, 30ᵇ and 31ª, 31ᵇ, respectively (Fig. 8). The slit may extend from one end to the other of the fastener, thus completely dividing the cover piece, but if preferred, the slit may be terminated approximately at the lower end of the series of fastener units, except when a separable bottom stop is employed,—thus leaving the undivided cover piece extending across from one stringer to the other at the lower end of the fastener. Since the edges of these flaps are produced by cutting the material, they are raw or unfinished edges, but if, for example, a braided or suitably woven fabric be employed, these edges will not ravel to any substantial extent even though unfinished. However, it is contemplated that they may be treated with any desired binding material, such, for example, as a cellulosic cement or the like, as a further safeguard against fraying, although this is not ordinarily necessary. Since these edges result from cutting a unitary piece of material which has already been attached to the opposed and complemental stringers, these edges necessarily match each other so that when brought together there is substantially no visible crevice between them. By reason of the presence of the channels 28 and 29, the free edges of the covering flaps tend to turn inwardly as the slider is actuated. Thus the movement of the slider irons down the covering material and keeps it in proper smooth condition, instead of plowing it up as is the case in usual forms of covered fastener.

Referring to Figs. 11, 12, and 13 the improved fastener unit is illustrated as employed in an uncovered fastener, and in Fig. 13 a preferred form of slider for use in closing the fastener is shown in sectional detail. This slider 10 comprises front and rear wings united by a neck portion in accordance with usual practice, but these wings differ from those of the usual slider in having their outer portions 34 and 35, and 36 and 37, respectively, shaped to conform substantially to the divergent edge surfaces of the attached fastener units. With this arrangement, when the slider is moved for closing the fastener, the portions 34 and 36, for example, of the front and rear wings exert pressure against the divergent surfaces of a given unit throughout an area extending substantially from the inner end of the unit to its point of maximum front-to-rear thickness. Since the forces exerted by the front and rear wings act in convergent directions, as illustrated by the arrows A in Fig. 13, they exert a strong tendency to keep the unit properly centered or symmetrically disposed with respect to the stringer upon which it is mounted. Furthermore, since a portion of the force exerted by the slider is applied very close to the front-to-rear plane of the edge bead, it acts with far less leverage to move the unit upwardly or downwardly out of proper relation to the other units than when the force is all applied at the extreme inner end of the unit, as is true in the usual type of fastener, which, for comparison with the operation of the new unit and slider, is diagrammatically illustrated in Figs. 14, 14a, and 15. In these figures the usual block-like unit U is illustrated as cooperating with a usual slider 10ᵐ having the front and rear wings $W^1$ and $W^2$, the wings each having an edge flange $F^1$ and $F^2$, respectively, such flanges engaging the extreme inner ends $U^1$ only of the units. Since, in a device such as a slide actuated fastener, it can not be expected that the force applied by the flanges $F^1$ and $F^2$ of the slider will always act accurately along the longitudinal dimension of the unit, it frequently happens that the applied force tends to swing a unit either upwardly or downwardly, as illustrated in dotted lines in Fig. 15, and to avoid this difficulty so far as possible it has been commonly thought necessary to make the attaching jaws of the unit quite long as compared with the outwardly projecting or interlocking end of the unit, the edge bead B commonly being approximately one-third of the distance from the outer to the inner end of the unit.

As already noted, in applicant's construction (Fig. 6) the axis of the edge bead is nearer to the inner than to the outer end of the unit and the unit is substantially shorter than the usual unit without sacrifice of the accuracy of the interengagement of the opposed series. This makes a substantial saving in material,—makes the fastener more flexible and lighter in weight, and insures a more certain operation, even though the units may become somewhat loose during a long period of use.

In Figs. 16 to 20 there is illustrated a slightly modified form of fastener employing fastener units of the type above referred to, but in which the slider is so shaped as to dispose the interengaged series of units somewhat differently from that commonly used. This construction is of especial utility as a closure for bags, tobacco pouches or the like in which the sides of the container which is to be closed are more or less parallel instead of lying substantially in the same plane, as is true in garments or the like.

In Figs. 16 and 17 the stringers $1^×$ and $2^×$ are shown as provided with fastener units $5^×$ and $6^×$, respectively, the stringers $1^×$ and $2^×$ being disposed at an acute angle, as illustrated particularly in Fig. 18. The slider which is employed in closing this fastener is illustrated in section in Fig. 20. This slider comprises the front wing 38 having the divergent margins 39 and 40 which are adapted to engage the outer edge surfaces of the legs 15 of the units $5^×$ and $6^×$, respectively. As may be seen from inspection of Fig. 18, the outer surfaces of the opposite legs 14 of the units of the opposite series are substantially in alignment and the slider has a rear wing 41 which is substantially flat and which engages these rear legs or jaws 14 of the units of the opposed series,—the wing 41 being substantially narrower than the front wing as may be seen from inspection of Figs. 16 and 17. The slider thus devised tends to hold the opposed series of units in the relative position shown in Fig. 18 and thus operates much more easily in a fastener having stringers arranged at an angle than would a slider of ordinary construction.

In the above description, for convenience, the fastener has been considered as occupying the position illustrated in Figs. 1, 2, 16, and 17, wherein the fastener is closed by upward movement of the slider and with this understanding such terms as "up and down" have been employed without any implication that the fastener may not be used in some other position. Likewise the ends of the fastener units which are most remote from the gap to be closed have been referred to as the "inner" ends, while the ends of the units which project outwardly from the edge of the stringer and which interlock with the units of the other series are referred to as the "outer" ends.

Likewise, that wing of the slider which is shown in Fig. 1 is referred to as the "front" wing and the corresponding face of the fastener as a whole as the "front" of the fastener, while the opposite face has been referred to as the "rear" face. Further, when the "front-to-rear" plane of the axis of the edge bead is referred to it is intended to refer to that plane which would be substantially perpendicular to the plane of the paper of the drawings, while the term "horizontal" has been employed as indicating the direction perpendicular to that of slider movement. However, these terms are all employed in a relative sense and with reference to the drawings, and are not to be regarded as restricting the use of the fastener.

While certain desirable embodiments of the invention have herein been illustrated by way of example, it is to be understood that the invention is not to be limited to the particular details shown, nor to the materials suggested, nor to the dimensions illustrated, but that any equivalent arrangements of parts and the substitution of other materials are to be regarded as within the scope of the invention as expressed in the appended claims.

I claim:

1. In a slide actuated fastener having a flexible support provided with an edge bead, a series of like fastener units each having a socket in one face and a pin projecting from the opposite face, each unit having attaching jaws straddling the edge bead and attaching it to the latter, each unit being of maximum front-to-rear thickness at the region of the bead and tapering substantially in thickness from said point toward both its outer and inner ends, the inner ends of the jaws being acute.

2. A fastener unit for use in slide actuated fasteners, said unit comprising spaced attaching jaws separated by a recess the bottom of which is defined by an arcuate wall, said unit also comprising a head of substantially the same size and contour as the recess, said head having a socket in one face and a pin projecting from its opposite face.

3. A fastener unit for use in a slide actuated fastener having a pair of flexible supports each provided with an edge bead to which a series of such fastener units is secured, said unit consisting of sheet metal and including a head portion and attaching jaws designed to straddle the edge bead of the support, the head portion having a socket in one face and a pin projecting from its opposite face, the head portion being smoothly curved at its outer end, the jaws of the unattached unit being spaced apart with a recess between them, the contour and dimensions of the head and recess being substantially identical, the outer edges of the jaws being substantially parallel and the free extremities of the jaws being acute.

4. A fastener unit for use in slide actuated fasteners, said unit comprising spaced attaching jaws separated by a recess having substantially parallel side walls and an end wall, the free ends of the jaws converging toward the recess, and a head substantially identical in contour and dimensions with the recess, said head having a pin projecting from one face and a socket in its opposite face.

5. A fastener unit for use in slide actuated fasteners, said unit comprising spaced attaching jaws separated by a recess having substantially parallel side walls merging with an arcuate end wall, and a head of a contour and dimensions substantially identical with that of the recess, said head having a pin projecting from one face and having a socket in its opposite face.

6. In a slide actuated fastener having a flexible support provided with a free edge, a series of like fastener units each attached to the free edge of the support and projecting outwardly beyond said edge, each unit being thickest in a front-to-rear direction at a point closely adjacent to said free edge of the support, the attached unit, in plan view, tapering in both directions from said point of maximum thickness, the outwardly projecting end portion of the unit comprising a relatively narrow head terminating in an arcuate edge and having a pin and socket, the extreme inner end of the unit substantially equalling the support in thickness.

7. A slide actuated fastener comprising flexible stringers each having an edge bead and a series of fastener units, each unit having a head designed to interlock with the heads of units of the opposed series and each unit comprising attaching jaws embracing the bead of its respective stringer, the outer surfaces of the jaws of each unit diverging from each other from the inner end of the unit toward points substantially in the front-to-rear plane of the axis of the bead to which they are attached at which point the unit is thickest, whereby, when the fastener is closed, the engaging units of the two series present a pair of longitudinally extending ridges with an intervening shallow channel, and a slider for closing the fastener, said slider having contact surfaces constructed and arranged to engage the outer divergent surfaces of the jaws of the units of the two series substantially from the inner end of each unit to the point of greatest thickness, the slider also having an internal rib intermediate said contact surfaces and which is disposed within said channel surfaces respectively engaging said outwardly divergent surfaces of the jaws.

8. A slide actuated fastener comprising flexible stringers and a series of fastener units secured to the edge of each stringer, the engaging portions of the units of the opposed series being thinner in the front-to-rear direction than the parts of the units which embrace the edge of the stringer, thereby, when the opposed series are engaged, providing a shallow channel extending longitudinally of the fastener, flexible covering elements each having an edge attached to one of the respective stringers and having their opposite edges in juxtaposition when the fastener is closed, such juxtaposed edges then overlying the aforesaid channel, and a slider having passages which respectively receive the opposite series of fastener elements and the covering element associated therewith, said slider also comprising a part which presses such juxtaposed edges of the covering element into said longitudinal channel as the slider is moved longitudinally of the fastener.

9. A slide actuated fastener comprising flexible stringers each having an edge bead and a series of fastener units, each unit having an attaching portion embracing the edge bead and an outwardly projecting head designed to interlock with the heads of units of the opposed series, said units being thickest in a front-to-rear direction where they embrace said edge bead whereby, when the fastener is closed, the engaged units of the two series present a pair of longitudinally extending ridges with an intervening shallow channel,— flexible covering means attached to the respective stringers and extending across said ridges and the channel when the fastener is closed, said covering means having a longitudinal slit where it overlies the channel, and a slider having passages for the reception of the covering means and the underlying ridges of the fastener unit series, the slider also including a part which tends to press the edges of the covering means at opposite sides of said slit into the longitudinal channel.

ROBERT C. LEGAT.